UNITED STATES PATENT OFFICE.

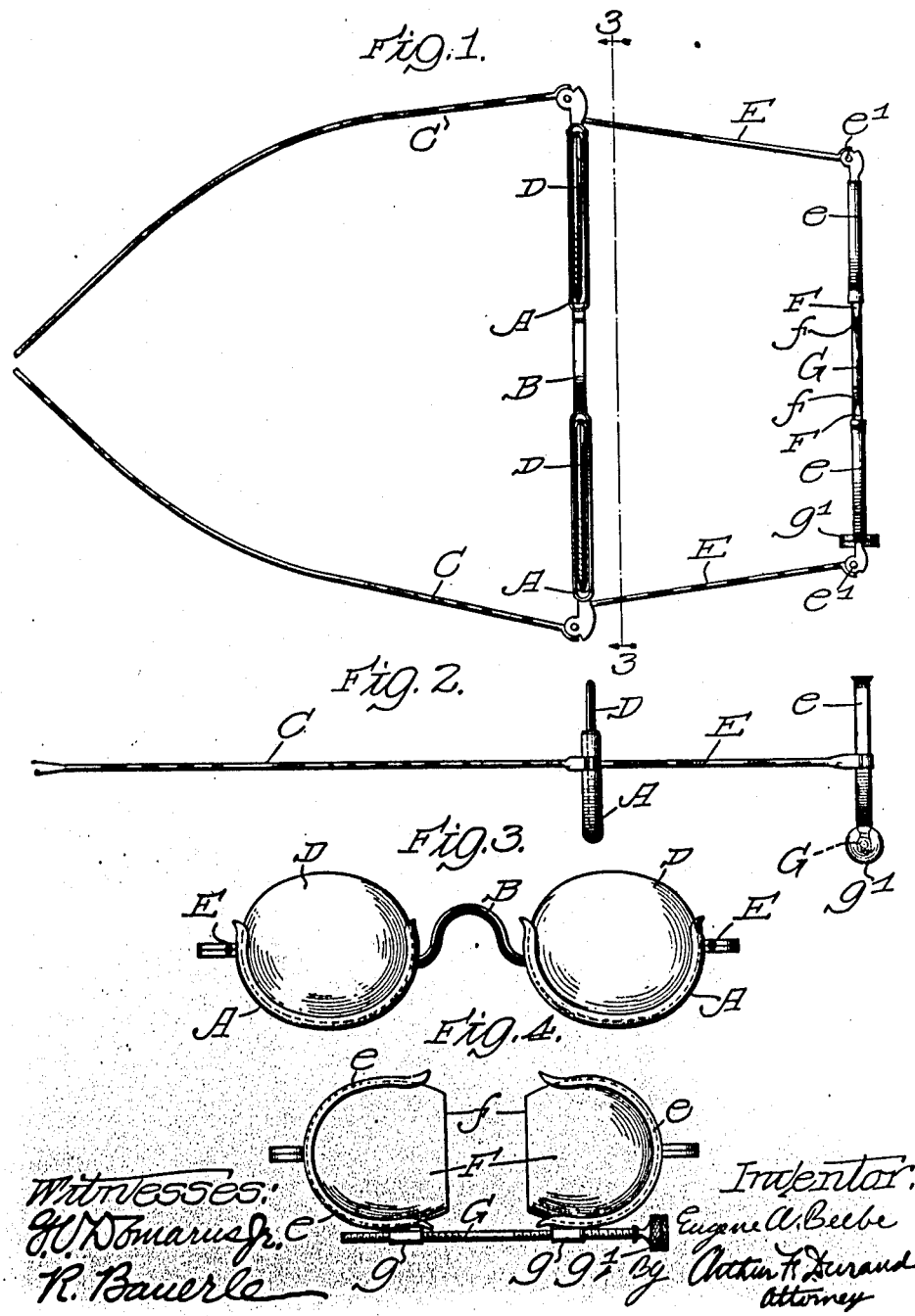

EUGENE W. BEEBE, OF MILWAUKEE, WISCONSIN.

BINOCULAR-MAGNIFIER.

1,086,802.  Specification of Letters Patent.  Patented Feb. 10, 1914.

Application filed August 2, 1912. Serial No. 712,906.

*To all whom it may concern:*

Be it known that I, EUGENE W. BEEBE, a citizen of the United States of America, and resident of Milwaukee, Milwaukee county, Wisconsin, have invented a certain new and useful Improvement in Binocular-Magnifiers, of which the following is a specification.

My invention relates to spectacles in general, but more particularly to those commonly known as binocular magnifiers, and especially those of the so-called double binocular magnifying type.

Generally stated, the object of my invention is to provide a novel and highly efficient form of spectacles of the foregoing general character.

A special object is to provide a novel construction and arrangement whereby the weight of an optical instrument of this character is materially reduced, especially at the outer end thereof, and whereby the same is simple and comparatively economical to manufacture.

Another object is to provide a novel and improved construction whereby the magnifying power of binocular magnifiers of this kind can be increased or reduced practically to any extent without increasing the weight thereof in an objectionable manner—that is to say, without increasing the weight of the forward or outer lens structure.

Another object is to provide a novel and improved construction whereby specially made lenses are not necessary—that is to say, whereby the forward or outer lenses are each merely an ordinary oval lens with the inner end thereof cut off to provide a straight edge, it being possible by this method to construct my improved binocular magnifiers from ordinary oval lenses, such as those usually found on the market, each lens requiring only a slight alteration at one end thereof.

It is also an object to provide certain details and features of construction tending to increase the general efficiency and serviceability of binocular spectacles of this particular character, and to render the same more satisfactory in use, as will hereinafter more fully appear.

In the accompanying drawings—Figure 1 is a plan view of a pair of magnifying spectacles embodying the principles of my invention. Fig. 2 is a side elevation of the same. Fig. 3 is a section on line 3—3 in Fig. 1. Fig. 4 is a front elevation of the said spectacle.

As thus illustrated, it will be seen that my invention comprises a pair of half rims A connected by a nose-bridge B and provided at their outer ends with temples C of the usual or any suitable, known or approved character. The lenses D are of the ordinary form, being simply oval lenses of the rimless form, and are each removably seated in the half rim A provided for that purpose. The spring arms E have their rear ends rigidly secured to the rims A and are each in the form of a small bendable wire, the two wires converging toward their outer ends. At their said outer ends the spring arms E are provided with pivoted half rims $e$ for holding the outer or forward lenses F, which latter, it will be seen, are of the rimless type, as they have no fixed rims. The half rims $e$ are connected together by an adjusting screw G, the said screw being provided with right and left threads engaging the threaded members $g$ on the lower edges of the rims $e$, whereby the rotation of the said screw will cause the arms E to move forward and away from each other. For the convenience of the user the screw G is provided with a thumb piece $g^1$, by which it can be rotated, the said thumb piece being preferably disposed at one end of said screw. The wires E are pivoted at $e^1$ to the outer ends of the rims $e$, which latter are open at their inner ends. The said spring arms E are very light and, being of small bendable wire, are adapted to be bent in any direction while the spectacles are being fitted to the user. Moreover, the lenses F are preferably of relatively low magnifying power, while the lenses D are of relatively high magnifying power, whereby the weight of the spectacles is considerably reduced at the outer end thereof. In other words, the lenses F are made as light as possible, and the required magnifying power is then obtained by using heavier lenses in the rims A, thus rendering the forward structure of the spectacles very light and less objectionable in character. It will also be seen that the lenses F are each made from an ordinary oval lens, such as those found on the market, by simply grinding or cutting off one end thereof, whereby specially ground lenses are not necessary.

The binocular magnifiers thus constructed can be used in conjunction with the lenses D of different magnifying power, as it is here that the magnifying power is determined or controlled. Ordinarily the lenses F are of minimum magnifying power, but should less magnifying power be required, this can then be obtained by using reducing lenses in the rims A—that is to say, by using rear lenses which will still further reduce the magnifying power. In this way, it will be seen that the rear lenses D become an essential element of the binocular magnifiers—that is to say, are essential for magnifying purposes. An increase of the magnifying power does not objectionably increase the weight, in view of the fact that the lenses F are of minimum size and weight, the increase in weight by the use of heavier lenses being close to the nose-bridge B and immediately at each side thereof. Thus the extreme outer end of the structure is made as light as possible and the spectacles are thereby rendered more comfortable and satisfactory in use. The space between the two straight inner edges $f$ of the forward lenses is not obstructed by any feature of construction, the two lenses practically standing up free and clear from connections or features of construction which might tend to interfere with the vision.

By using the lens holders $e$ the lenses F can be used interchangeably with other lenses. In each case, however, these lenses have straight inner edges which can be brought together or separated to suit the requirements of any particular case. Thus there is nothing between the lenses to interfere with vision.

It will be seen from the foregoing that I provide a pair of magnifying spectacles in which the front lenses are practically not employed for magnifying purposes, but merely for focusing purposes, these lenses alone, without anything else, being insufficient for the purpose of a pair of spectacles of this kind. With the constructions heretofore employed, the magnifying was done by the forward lenses—that is to say, by the lenses which are held a distance from the face, and as it was often necessary to use powerful lenses, it followed that great weight was frequently carried at a distance from the face, and the wearing of the spectacles was made uncomfortable to the user. My invention contemplates, therefore, a pair of spectacles of this kind in which the weight at the forward end of the arms is reduced to a minimum, and in which rear lenses are necessary as an essential part of the magnifying device, and are not used for correcting vision, whereby the lenses of great weight, when a powerful magnifying action is required, are close to the face. In this way heavy magnifying lenses can be worn comfortably, whereas with the old construction, in which the lenses were carried at the ends of flexible arms, there was considerable difficulty experienced in wearing the spectacles and objections were frequent. So far as I am aware, therefore, I am the first to provide front lenses which are employed for focusing purposes only, and which are of such character as to render absolutely necessary the use of another pair of magnifying lenses in a device of this kind.

What I claim as my invention is:

1. A pair of spectacles comprising a pair of front lenses of relatively low magnifying power, for binocular focusing purposes, serving to reduce weight in front, and a pair of rear lenses of relatively high magnifying power.

2. A pair of spectacles comprising a pair of front lenses of certain magnifying power, for binocular focusing purposes, and a pair of rear lenses coöperating with said front lenses to conjointly give a different magnifying power, whereby the rear lenses are essential for the required magnifying power.

3. A pair of spectacles comprising a wire frame, arms extending forward from said frame, lens holders at the ends of said arms, free and open at their inner or adjacent ends, and a rimless lens removably held in each holder, with a clear space between the adjacent bare edges of said lenses.

4. A pair of spectacles comprising a wire frame, arms extending forward from said frame, lens holders at the ends of said arms, free and open at their inner or adjacent ends, and a rimless lens removably held in each holder, with a clear space between the adjacent bare edges of said lenses, each lens being an oval with the inner end thereof cut off straight to provide a vertical inner edge therefor.

5. A pair of spectacles comprising a wire frame, arms extending forward from said frame, lens holders at the ends of said arms, free and open at the inner or adjacent ends, a rimless lens removably held in each holder, with a clear space between the adjacent bare edges of said lenses, and means for adjusting the said lenses toward and away from each other, to vary the distance between the said base edges thereof, said holders being unconnected except by said means.

6. A pair of spectacles comprising a frame, and lenses mounted on said frame, disposed a distance from the face, each lens consisting of an ordinary oval lens with the inner end thereof cut off to provide a vertical edge, with a clear space between the two bare edges thus formed.

7. A pair of spectacles comprising a frame, lenses mounted on said frame, disposed a distance from the face, each lens consisting of an ordinary oval lens with the inner end thereof cut off to provide a vertical edge, with a clear space between the two bare edges thus formed, in combination with means for varying the distance between said edges.

8. A pair of spectacles comprising a pair of front lenses of relatively low magnifying power for binocular focusing purposes, serving to reduce weight in front, and a pair of rear lenses of relatively high magnifying power, together with means for adjusting the pupillary distance of said front lenses.

9. A pair of spectacles comprising a pair of front lenses of certain magnifying power, for binocular focusing purposes, and a pair of rear-lenses coöperating with said front lenses to conjointly give a different magnifying power, whereby the magnifying power of the spectacles, as a whole, is controlled close to the face, whereby the rear lenses are essential for the required magnifying power, together with means for adjusting the pupillary distance of said front lenses.

10. A pair of spectacles comprising a pair of front lenses of relatively low magnifying power, for binocular focusing purposes, serving to reduce weight in front, and a pair of rear lenses of relatively high magnifying power, serving to bring the weight close to the face, together with means whereby said rear lenses are removable and replaceable by other lenses to govern the magnifying power of said spectacles.

11. A pair of spectacles comprising a pair of front lenses of certain magnifying power, for binocular focusing purposes, and a pair of rear lenses for coöperating with said front lenses to conjointly give a different magnifying power, whereby the magnifying power of the spectacles, as a whole, is controlled close to the face, whereby the rear lenses are essential for the required magnifying power, together with means whereby said rear lenses are removable and replaceable by other lenses to govern the magnifying power of said spectacles.

12. A pair of spectacles having lenses each of which consists of an oval lens having the inner end thereof cut off to form a vertical rimless inner edge therefor.

Signed by me at Milwaukee, Wisconsin, this 26th day of July, 1912.

E. W. BEEBE.

Witnesses:
C. B. DAVIS,
JOHN S. STOVER.

---

Copies of this patent may be obtained for five cents each, by addressing the "Commissioner of Patents, Washington, D. C."